(No Model.)

A. A. CLEARWATER.
LIQUID HEATING DEVICE.

No. 438,469. Patented Oct. 14, 1890.

Witnesses.
Robert Everett.
Wm. H. Muzzy.

Inventor:
Alfred A. Clearwater
by W. H. Babcock
Attorney

UNITED STATES PATENT OFFICE.

ALFRED A. CLEARWATER, OF WILCOX, PENNSYLVANIA.

LIQUID-HEATING DEVICE.

SPECIFICATION forming part of Letters Patent No. 438,469, dated October 14, 1890.

Application filed March 7, 1890. Serial No. 343,052. (No model.)

*To all whom it may concern:*

Be it known that I, ALFRED A. CLEARWATER, a citizen of the United States, residing at Wilcox, in the county of Elk and State of Pennsylvania, have invented certain new and useful Improvements in Liquid-Heating Devices; and I do hereby declare the following to be a full, clear, and exact description of the invention, such as will enable others skilled in the art to which it appertains to make and use the same.

My invention relates to improvements in liquid-heating devices in which the liquid to be heated is contained within a closed vessel having inlet and outlet pipes, said vessel being inclosed by a steam-chamber also supplied with inlet and outlet pipes.

The said invention consists in the construction and combination of parts hereinafter particularly set forth and claimed.

Figure 1:
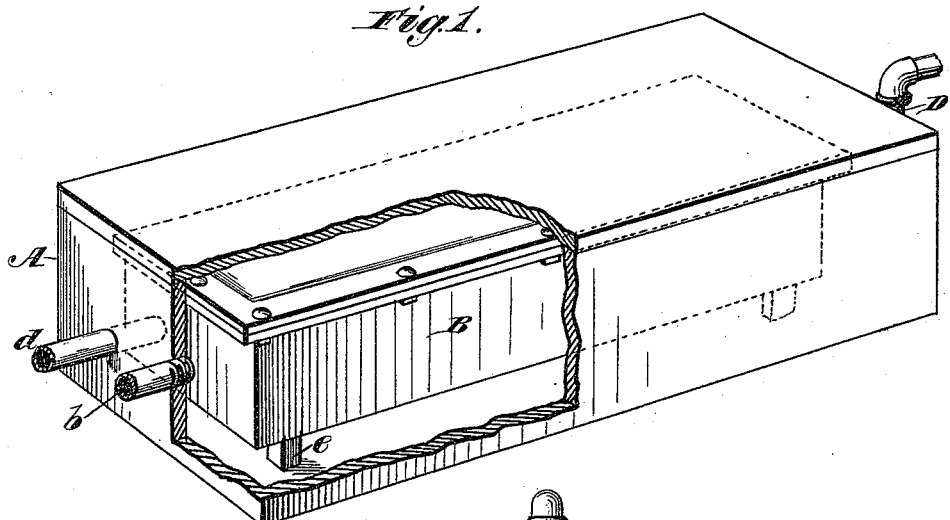
Figure 2:
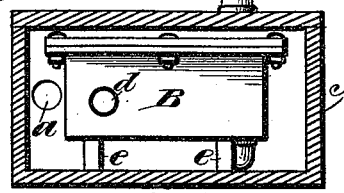
Figure 3:
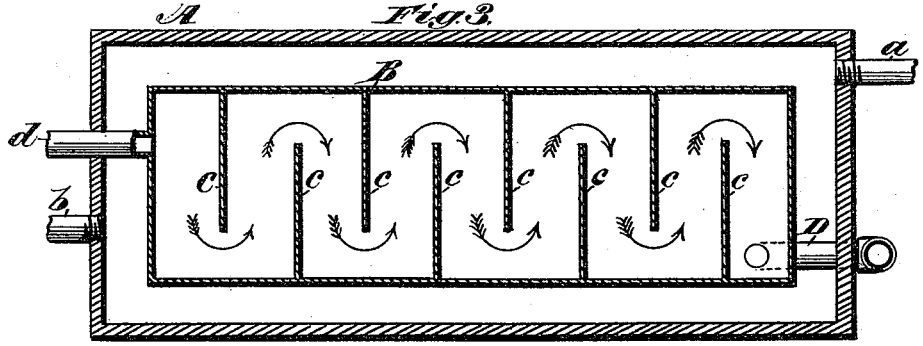
Figure 4:
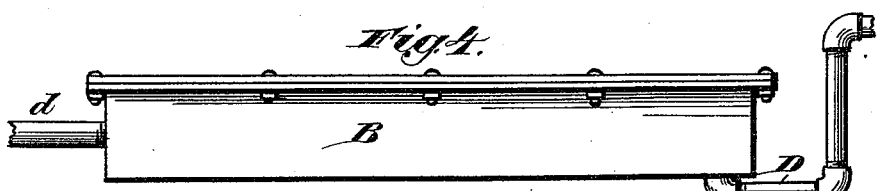

Figure 1 represents a perspective view, partly broken away, of the devices embodied in my invention. Fig. 2 represents a vertical transverse section of the same. Fig. 3 represents a horizontal longitudinal section of said devices. Fig. 4 represents a detail view of a liquid-containing vessel with inlet and outlet pipes attached.

Similar letters refer to similar parts throughout the several views.

The outer or steam chamber A with its inlet-pipe $a$ and outlet-pipe $b$ constitute the heating portion of my device. In the inner or liquid-heating vessel B are the partitions $c\ c\ c\ c\ c\ c$ for circulating the liquid after it enters from inlet-pipe $d$. At the other end of vessel B is the outlet-pipe D. Supporting the vessel B are the legs $e\ e\ e\ e$.

When it is desired to heat the liquid, steam is entered at inlet-pipe $a$. It then occupies the chamber A, completely surrounding (on all sides) the (closed) vessel B. It then passes off at outlet-pipe $b$. At the same time that steam enters the steam-chamber A through $a$ the liquid is forced into the heating-vessel B through the inlet-pipe $d$. After being freely circulated (by partitions $c\ c\ c\ c$) and heated, it passes off at outlet-pipe D. Said pipe D receives the liquid from the bottom of the vessel; but just outside of the vessel it rises to a height slightly greater than the top of the vessel B, thereby keeping said vessel B always full. When the liquid that remains in the vessel B after the supply at $d$ has been cut off is to be removed, the outlet-pipe D is closed and the liquid siphoned out at $d$.

Having thus fully described my invention, what I claim as new, and desire to secure by Letters Patent, is—

1. In a liquid-heating device, the combination of an outer vessel with an inner vessel having a series of alternately-arranged partitions $c$ extending inwardly from its opposite sides to form a zigzag channel, each of said vessels being provided with inlet and outlet pipes, in order that steam may flow through the one while liquid flows through the other, the said vessels being also arranged to leave a steam-space between them surrounding the inner vessel, substantially as set forth.

2. In a liquid-heating device, the combination of an outer vessel having inlet and outlet pipes with an inner vessel also having inlet and outlet pipes, the latter pipe rising from the bottom of said inner vessel to a height slightly above the top of it, said inner vessel also being provided with vertical partitions which cross it from one side to within a short distance of the other and extend from top to bottom of said vessel, said partitions being fixed every other one to opposite sides, said inner vessel being also provided with legs which allow the steam in said outer vessel to pass under as well as over and around it, all substantially as set forth.

In testimony whereof I affix my signature in presence of two witnesses.

ALFRED A. CLEARWATER.

Witnesses:
P. S. EMHOUT,
D. K. COUDON.